United States Patent
Wang et al.

(10) Patent No.: US 9,652,560 B1
(45) Date of Patent: May 16, 2017

(54) NON-BLOCKING MEMORY MANAGEMENT UNIT

(75) Inventors: James Wang, Cupertino, CA (US);
Robert A. Drebin, Cupertino, CA (US);
Patrick Y. Law, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 116 days.

(21) Appl. No.: 13/314,005

(22) Filed: Dec. 7, 2011

Related U.S. Application Data

(60) Provisional application No. 61/509,096, filed on Jul. 18, 2011.

(51) Int. Cl.
*G09G 5/39* (2006.01)
*G06F 17/30* (2006.01)

(52) U.S. Cl.
CPC .............................. *G06F 17/30994* (2013.01)

(58) Field of Classification Search
None
See application file for complete search history.

(56) References Cited

U.S. PATENT DOCUMENTS

| | | | |
|---|---|---|---|
| 5,594,860 A | 1/1997 | Gauthier | |
| 6,212,603 B1 * | 4/2001 | McInerney et al. | 711/125 |
| 7,167,181 B2 | 1/2007 | Duluk, Jr. et al. | |
| 7,369,135 B2 | 5/2008 | Abdalla et al. | |
| 7,512,773 B1 | 3/2009 | Shebanow et al. | |
| 7,710,424 B1 | 5/2010 | Hutchins et al. | |
| 8,266,383 B1 * | 9/2012 | Minkin et al. | 711/125 |
| 2006/0092165 A1 * | 5/2006 | Abdalla et al. | 345/545 |
| 2007/0103476 A1 * | 5/2007 | Huang et al. | 345/522 |
| 2007/0165035 A1 | 7/2007 | Duluk et al. | |
| 2007/0180041 A1 * | 8/2007 | Suzuoki | H04L 67/1097 709/207 |
| 2008/0106552 A1 * | 5/2008 | Everitt | 345/552 |
| 2008/0177952 A1 * | 7/2008 | Morrow | 711/133 |
| 2008/0276066 A1 | 11/2008 | Lee et al. | |
| 2009/0300294 A1 * | 12/2009 | Moyer et al. | 711/144 |
| 2010/0005243 A1 * | 1/2010 | Yagi | 711/126 |
| 2011/0119535 A1 * | 5/2011 | Shirahige et al. | 714/54 |
| 2012/0194524 A1 * | 8/2012 | Hartog | G06T 1/20 345/501 |

* cited by examiner

*Primary Examiner* — Barry Drennan
*Assistant Examiner* — Khoa Vu
(74) *Attorney, Agent, or Firm* — Meyertons, Hood, Kivlin, Kowert & Goetzel, P.C.

(57) ABSTRACT

Techniques are disclosed relating to handling page faults created by a processor unit. In some embodiments, such techniques may be used within the context of graphics processor units (GPUs) to reduce the chances that a page fault will result in a GPU-pipeline stall. In one embodiment, a processor includes a graphics processor pipeline and a memory management unit. The graphics processor pipeline includes a plurality of pipeline stages. The memory management unit is configured to determine that a first data request from a first of the plurality of pipeline stages causes a page fault, and to service requests from one or more others of the plurality of pipeline stages while the page fault is being serviced.

17 Claims, 10 Drawing Sheets

NON-BLOCKING MEMORY MANAGEMENT UNIT

This application claims the benefit of U.S. Provisional Application No. 61/509,096 filed on Jul. 18, 2011, which is incorporated by reference herein in its entirety.

BACKGROUND

Technical Field

This disclosure relates generally to computer memory, and, more specifically, to handling memory page faults.

Description of the Related Art

Modern computer systems typically implement a virtual memory system in which primary storage (i.e., main memory) such as random access memory (RAM) is used as a cache for secondary storage such as hard disk drives, optical drives, etc. To process a request to access a particular memory location, a memory management unit (MMU) may receive a virtual memory address of the memory location and translate the virtual address to a corresponding physical address in memory. The MMU may then reference the physical address to retrieve the desired data.

Mappings for virtual addresses to physical addresses are typically stored in a data structure called a page table. A mapping may be inserted when an operating system loads a set of data (called a page) from secondary storage into primary storage. In some instances, a page fault may occur when an MMU is unable to determine the physical address for a given virtual address because the page table does not include a mapping for that address, the mapping is no longer valid, etc.

A central processor unit (CPU) may handle a page fault by invoking the operating system to retrieve the requested data from secondary storage. Since servicing a page fault (e.g., retrieving the data from secondary storage, writing it into primary storage, inserting a corresponding mapping into the page table, etc.) can take a significant amount of time, a CPU typically performs a context switch in which the CPU stops execution of the process that created the page fault and begins executing other processes. The CPU may resume execution of the initial process after the operating system has serviced the page fault.

Page faults can be problematic for a graphics processor unit (GPU) because it typically cannot perform a context switch from rendering a display to some other task, and thus ends up stalling. Any stall can easily be visible to the user. As a result, many GPUs do not support usage of virtual memory or require that all needed pages be loaded prior to performing any rendering to prevent potential page faults from occurring.

SUMMARY

The present disclosure describes techniques for handling page faults created by a processor unit. In some embodiments, such techniques may be particularly applicable to graphics processor units (GPUs) to reduce the chances that a page fault will result in a graphics pipeline stall.

As will be described below, in various embodiments, stages in a pipeline may provide data requests for read and write operations to a memory management unit (MMU) that interfaces with main memory. If a read request causes a page fault, the MMU may send a response to the requesting pipeline stage (as it may do with a non-faulting request), but this response may differ from a response for a non-faulting request in that it does not include the requested data. In one embodiment, the response instead indicates that a fault occurred and may include information needed by the pipeline stage to subsequently replay the request (in some embodiments, this information may be included in the portion of the request that is normally used for specifying the requested data). The pipeline stage may then replay the request after a set of one or more criteria have been satisfied. If the fault has not been serviced (e.g., by an operating system executing on a corresponding CPU), the MMU may again send a response indicating a fault. Once the page fault has been serviced, however, the pipeline stage may replay the request and receive the desired data. In various embodiments, the MMU continues to service requests from various pipeline stages while the fault is pending (as opposed to waiting (i.e., blocking) to service any requests until after the fault has been serviced).

In many instances, preventing the MMU from blocking reduces the chances that a page fault will result in a pipeline stall. In some embodiments, handing page faults in this manner also permits pages to be loaded as needed (as opposed to requiring that all needed pages be loaded before the pipeline begins any processing).

DETAILED DESCRIPTION

Figure 1:
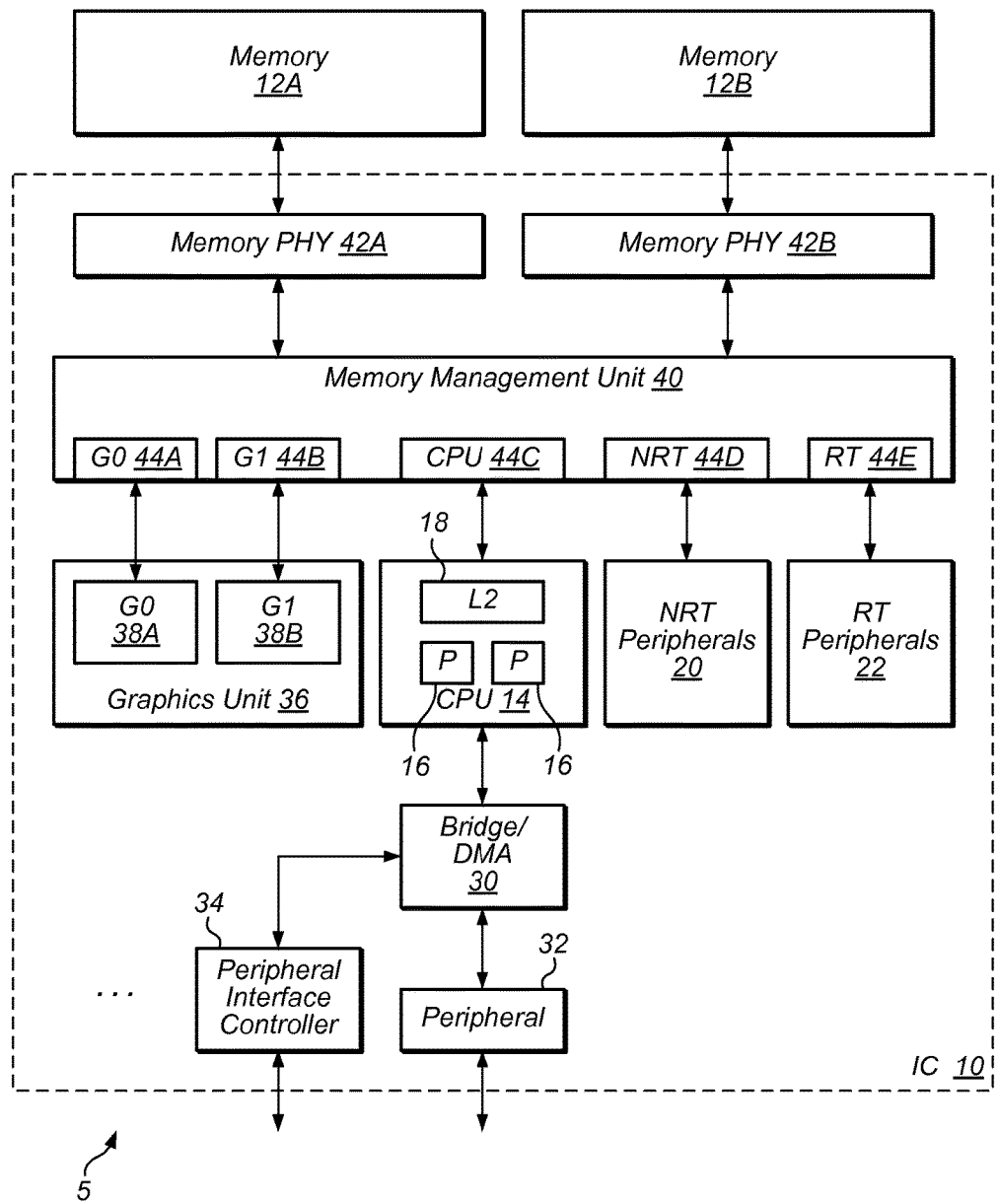
FIG. 1 is a block diagram illustrating one embodiment of an integrated circuit.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

"First," "Second," etc. As used herein, these terms are used as labels for nouns that they precede, and do not imply any type of ordering (e.g., spatial, temporal, logical, etc.). For example, in a processor having eight processing elements or cores, the terms "first" and "second" processing elements can be used to refer to any two of the eight processing elements. In other words, the "first" and "second" processing elements are not limited to logical processing elements 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Processor." This term has its ordinary and accepted meaning in the art, and includes a device that is capable of executing computer instructions. A processor may refer, without limitation, to a central processing unit (CPU), a co-processor, an arithmetic processing unit, a graphics processing unit (GPU), a digital signal processor (DSP), etc. A processor may be a superscalar processor with a single or multiple pipelines. A processor may include a single or multiple cores that are each configured to execute computer instructions.

The present disclosure initially presents an overview (in conjunction with FIG. 1) of a system (here, a system on a chip, or SoC) that may include a graphics controller and MMU that implement techniques described herein. Techniques for handling page faults are then described in conjunction with FIGS. 2-9. The disclosure then concludes with a description of an exemplary computer system (which may include the graphics controller and MMU) in conjunction with FIG. 10.

Exemplary System

Turning now to FIG. 1, a block diagram of one embodiment of a system 5 is shown. In the embodiment of FIG. 1, the system 5 includes an integrated circuit (IC) 10 coupled to external memories 12A-12B. In the illustrated embodiment, the integrated circuit 10 includes a central processor unit (CPU) block 14, which includes one or more processors 16 and a level 2 (L2) cache 18. Other embodiments may not include L2 cache 18 and/or may include additional levels of cache. Additionally, embodiments that include more than two processors 16 and that include only one processor 16 are contemplated. The integrated circuit 10 further includes a set of one or more non-real time (NRT) peripherals 20 and a set of one or more real time (RT) peripherals 22. In the illustrated embodiment, the CPU block 14 is coupled to a bridge/direct memory access (DMA) controller 30, which may be coupled to one or more peripheral devices 32 and/or one or more peripheral interface controllers 34. The number of peripheral devices 32 and peripheral interface controllers 34 may vary from zero to any desired number in various embodiments. The system 5 illustrated in FIG. 1 further includes a graphics unit 36 comprising one or more graphics controllers such as G0 38A and G1 38B. The number of graphics controllers per graphics unit and the number of graphics units may vary in other embodiments. As illustrated in FIG. 1, the system 5 includes a memory management unit (MMU) 40 coupled to one or more memory physical interface circuits (PHYs) 42A-42B. The memory PHYs 42A-42B are configured to communicate on pins of the integrated circuit 10 to the memories 12A-12B. The MMU 40 also includes a set of ports 44A-44E. The ports 44A-44B are coupled to the graphics controllers 38A-38B, respectively. The CPU block 14 is coupled to the port 44C. The NRT peripherals 20 and the RT peripherals 22 are coupled to the ports 44D-44E, respectively. The number of ports included in MMU 40 may be varied in other embodiments, as may the number of MMUs. That is, there may be more or fewer ports than those shown in FIG. 1. The number of memory PHYs 42A-42B and corresponding memories 12A-12B may be one or more than two in other embodiments.

Generally, a port may be a communication point on the MMU 40 to communicate with one or more sources. In some cases, the port may be dedicated to a source (e.g. the ports 44A-44B may be dedicated to the graphics controllers 38A-38B, respectively). In other cases, the port may be shared among multiple sources (e.g. the processors 16 may share the CPU port 44C, the NRT peripherals 20 may share the NRT port 44D, and the RT peripherals 22 may share the RT port 44E. Each port 44A-44E is coupled to an interface to communicate with its respective agent. The interface may be any type of communication medium (e.g. a bus, a point-to-point interconnect, etc.) and may implement any protocol. The interconnect between the MMU and sources may also include any other desired interconnect such as meshes, network on a chip fabrics, shared buses, point-to-point interconnects, etc.

The processors 16 may implement any instruction set architecture, and may be configured to execute instructions defined in that instruction set architecture. The processors 16 may employ any microarchitecture, including scalar, superscalar, pipelined, superpipelined, out of order, in order, speculative, non-speculative, etc., or combinations thereof. The processors 16 may include circuitry, and optionally may implement microcoding techniques. The processors 16 may include one or more level 1 caches, and thus the cache 18 is an L2 cache. Other embodiments may include multiple levels of caches in the processors 16, and the cache 18 may be the next level down in the hierarchy. The cache 18 may employ any size and any configuration (set associative, direct mapped, etc.).

The graphics controllers 38A-38B may be any graphics processing circuitry. Generally, the graphics controllers 38A-38B may be configured to render objects to be displayed into a frame buffer. The graphics controllers 38A-38B may include graphics processors that may execute graphics software to perform a part or all of the graphics operation, and/or hardware acceleration of certain graphics operations. The amount of hardware acceleration and software implementation may vary from embodiment to embodiment.

The NRT peripherals 20 may include any non-real time peripherals that, for performance and/or bandwidth reasons, are provided independent access to the memory 12A-12B. That is, access by the NRT peripherals 20 is independent of the CPU block 14, and may proceed in parallel with CPU block memory operations. Other peripherals such as the peripheral 32 and/or peripherals coupled to a peripheral interface controlled by the peripheral interface controller 34 may also be non-real time peripherals, but may not require independent access to memory. Various embodiments of the NRT peripherals 20 may include video encoders and decoders, scaler circuitry and image compression and/or decompression circuitry, etc.

The RT peripherals 22 may include any peripherals that have real time requirements for memory latency. For example, the RT peripherals may include an image processor and one or more display pipes. The display pipes may include circuitry to fetch one or more frames and to blend the frames to create a display image. The display pipes may further include one or more video pipelines. The result of the display pipes may be a stream of pixels to be displayed on the display screen. The pixel values may be transmitted to a display controller for display on the display screen. The image processor may receive camera data and process the data to an image to be stored in memory.

The bridge/DMA controller 30 may comprise circuitry to bridge the peripheral(s) 32 and the peripheral interface controller(s) 34 to the memory space. In the illustrated embodiment, the bridge/DMA controller 30 may bridge the memory operations from the peripherals/peripheral interface controllers through the CPU block 14 to the MMU 40. The CPU block 14 may also maintain coherence between the bridged memory operations and memory operations from the processors 16/L2 Cache 18. The L2 cache 18 may also arbitrate the bridged memory operations with memory operations from the processors 16 to be transmitted on the CPU interface to the CPU port 44C. The bridge/DMA controller 30 may also provide DMA operation on behalf of the peripherals 32 and the peripheral interface controllers 34 to transfer blocks of data to and from memory. More particularly, the DMA controller may be configured to perform transfers to and from the memory 12A-12B through the MMU 40 on behalf of the peripherals 32 and the peripheral interface controllers 34. The DMA controller may be programmable by the processors 16 to perform the DMA operations. For example, the DMA controller may be programmable via descriptors. The descriptors may be data structures stored in the memory 12A-12B that describe DMA transfers (e.g. source and destination addresses, size, etc.). Alternatively, the DMA controller may be programmable via registers in the DMA controller (not shown).

The peripherals 32 may include any desired input/output devices or other hardware devices that are included on the integrated circuit 10. For example, the peripherals 32 may include networking peripherals such as one or more networking media access controllers (MAC) such as an Ethernet MAC or a wireless fidelity (WiFi) controller. An audio unit including various audio processing devices may be included in the peripherals 32. One or more digital signal processors may be included in the peripherals 32. The peripherals 32 may include any other desired functional such as timers, an on-chip secrets memory, an encryption engine, etc., or any combination thereof.

The peripheral interface controllers 34 may include any controllers for any type of peripheral interface. For example, the peripheral interface controllers may include various interface controllers such as a universal serial bus (USB) controller, a peripheral component interconnect express (PCIe) controller, a flash memory interface, general purpose input/output (I/O) pins, etc.

The memories 12A-12B may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with the integrated circuit 10 in a chip-on-chip configuration, a package-on-package configuration, or a multi-chip module configuration.

The memory PHYs 42A-42B may handle the low-level physical interface to the memory 12A-12B. For example, the memory PHYs 42A-42B may be responsible for the timing of the signals, for proper clocking to synchronous DRAM memory, etc. In one embodiment, the memory PHYs 42A-42B may be configured to lock to a clock supplied within the integrated circuit 10 and may be configured to generate a clock used by the memory 12.

It is noted that other embodiments may include other combinations of components, including subsets or supersets of the components shown in FIG. 1 and/or other components. While one instance of a given component may be shown in FIG. 1, other embodiments may include one or more instances of the given component. Similarly, throughout this detailed description, one or more instances of a given component may be included even if only one is shown, and/or embodiments that include only one instance may be used even if multiple instances are shown.

Page Fault Management

Figure 2:
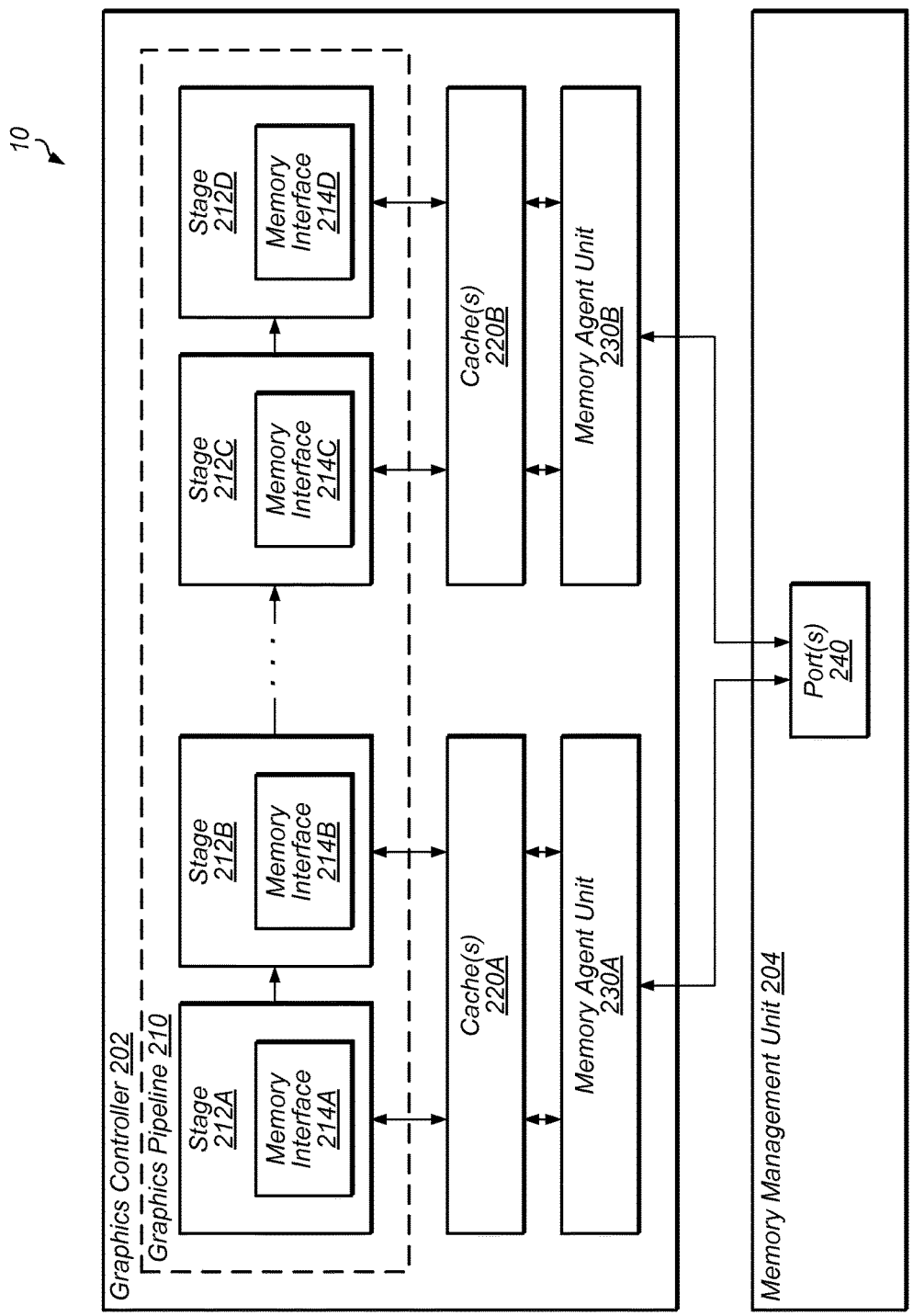
FIG. 2 is a block diagram illustrating a graphics controller and a memory management unit, which may be included within the integrated circuit.

Turning now to FIG. 2, a block diagram of a graphics controller 202 and a memory management unit (MMU) 204 is depicted. Graphics controller 202 is one embodiment of circuitry that includes a pipeline having multiple stages that are configured to generate data requests in a system that implements a virtual memory. In some instances, some of these requests may produce page faults. As will be described below, MMU 204 is one embodiment of an MMU that is configured to service data requests without blocking when a page fault occurs.

In the illustrated embodiment, graphics controller 202 and MMU 204 are depicted within IC 10 described above (in some embodiments, controller 202 and MMU 204 may correspond to a controller 38 and MMU 40, respectively). In other embodiments, graphics controller 202 and MMU 204 may be implemented independently of IC 10. For example, in some embodiments, controller 202 and MMU 204 may be included within graphics processor unit (GPU), may be located on separate dies, may share a die with a central processing unit (such as CPU 14 described above), etc.

In the illustrated embodiment, graphics controller 202 includes a graphics pipeline 210 with pipeline stages 212A-D, caches 220A and 220B, and memory agent units 230. Graphics controller 202 is coupled to MMU 204 via one or more ports 240. In some embodiments, controller 202 may include more or less stages 212, caches 220, and/or memory agent units 230.

Graphics pipeline 210, in one embodiment, is configured to process graphic primitives to render frames of pixels for display. Graphics pipeline 210 may implement any suitable graphics pipeline architecture, such as the OPENGL architecture, DIRECTX architecture (e.g., DIRECT3D), etc. Accordingly, stages 212 may correspond to any suitable graphics pipeline stages such as a transformation stage (e.g., for rotating, translation, and scaling primitives), a lighting and coloring stage, a texture stage, a primitive-assembly stage, a clipping stage, a rasterization stage, etc.

In the illustrated embodiment, various stages 212 include a respective memory interface unit 214A-D to transmit and receive data requests (i.e., write and read requests) to and from caches 220 and MMU 204. In various embodiments, these requests are addressed to virtual memory locations (i.e., specify virtual addresses). In one embodiment, when a read request is transmitted and successfully serviced by caches 220 or MMU 204, a memory interface unit 214 may receive a corresponding response with the requested data. As will be described below, in various embodiments, if the request instead causes a page fault, an interface unit 214 may receive a corresponding response indicating that the page fault occurred for that request. In some embodiments, this response may have a similar format as a normal response (i.e., a response that did not cause a fault), but does not include the requested data since it is not yet available.

In various embodiments, interface units 214 may be configured to retransmit (i.e., replay) read requests that produced page faults (in some embodiments, units 214 may also replay write requests) to receive requested data from caches 220 or MMU 204 once the faults have been serviced. In some embodiments, an interface unit 214 may not store all the information needed to reproduce a response for retransmission (although it may still store information used to process a response that includes requested data, such as the request ID, an indication of the source that generated the request, etc.). To account for this deficiency, interface unit 214 may receive this information from caches 220, memory agent 230, and/or MMU 204. In one embodiment, this information may be inserted into the response where the requested data would normally be inserted if the request did not produce a fault. A memory interface unit 214 may be configured to extract and decode this information in order to reproduce a request for retransmission. Memory interface units 214 are described in further detail below in conjunction with FIG. 4.

Caches 220 are representative of one or more cache levels that may be included between memory interface units 214 and MMU 204. In various embodiments, caches 220 may include caches that are virtual-memory addressable (i.e., data is cached based on virtual addresses instead of physical addresses.) In one embodiment, caches 220 may include an initial level of L0 caches that each corresponds to a respective stage 212. If a data request misses in this initial level (e.g., the requested data is not stored in that cache level or the cache line for that address is no longer valid), caches 220, in one embodiment, may include an additional level of L1 caches to service requests. In some embodiments, caches 220 in this level may be shared by multiple stages 212 (i.e., service requests from multiple stages 212); caches 220 may also include further additional levels. If a data request misses in caches 220 in the illustrated embodiment, the data request is provided to a memory agent 230 (described below) for transmission to MMU 204. In various embodiments, caches 220 may allocate cache lines for missed requests and store relevant information about the requests to process received responses.

Once a response for a request is received, caches 220 may store contents of that response in the allocated cache line. If the response is a normal response, these contents may include the requested data and any corresponding metadata. The response may also be forwarded to upper-level caches (e.g., from L1 cache to an L0 cache); in some embodiments, a cache 220 may append additional information to the response to assist upper levels in processing it. In various embodiments, if the request is response that indicates a fault, cache 220 may store contents of the request in a cache line (as it does for normal a response), but these contents may include information that may be used by memory interface 214 to reproduce the original request. In one embodiment, caches 220 may further set a flag in the cache line to indicate that the cache line does not have the requested data yet. As will be described below, in various embodiments, when memory interface unit 214 subsequently retransmits a request after the page fault has been serviced, cache 220 may be configured to treat the request as a miss and then receive the data from MMU 204. (In other embodiments, MMU 204 may be configured to provide a subsequent response that includes the requested data without receiving a replayed request). Caches 220 may then replace the contents in the cache line with the requested data and clear the flag. Caches 220 are described in further detail below in conjunction with FIG. 5.

Memory agent unit 230, in one embodiment, is configured to receive and transmit requests and responses for multiple stages 212; in some embodiments, routing requests and responses through units 230 reduces the number of buses and ports needed to facilitate communication between stages 212 and MMU 204. In one embodiment, memory agent units 230 may store requests as they are received from caches 220 in queues. Memory agent units 230 may then pull requests from the queues according to an arbitration scheme and then transmit the requests to MMU 204. In various embodiments, memory agent units 230 may service responses from MMU 204 in a similar manner.

In some embodiments, memory interface units 210 and/or caches 220 may need to receive responses in the same order that the requests were initially generated; however, MMU 204 may be configured to service requests such that their responses are generated out of order. In one embodiment, memory agent units 230 are configured to store an ordering in which a set of data requests are received and use the stored ordering to reorder the corresponding set of responses before providing them to caches 220 and memory interface units 214. In some embodiments, memory agent units 230 may also append additional information to responses that is used by memory interface units 214 and/or caches 220 to process those responses upon receipt. Memory agent units 230 are described in further detail below in conjunction with FIG. 6.

As noted above, memory management unit (MMU) 204, in one embodiment, is configured to process data requests generated by controller 202 and associated with system memory (e.g., memory 12 described above); in some embodiments, MMU 204 may also process requests generated by other sources (such as those described above in conjunction with MMU 40). In various embodiments, when MMU receives a data request, MMU 204 attempts to translate a virtual address specified by the request to a corresponding physical address by using translation cache such as a translation-lookaside buffer (TLB). If the translation cache includes a corresponding entry for the virtual address, MMU 204 may replace the virtual address with the physical address and forward the request to system memory. In various embodiments, if the virtual address misses in the translation cache, MMU 204 may be configured to perform a page table walk in which MMU 204 accesses a page table in memory to determine a translation. If a translation is found, MMU 204 may update the translation cache and forward the request to memory with the physical address. In various embodiments, if a translation is not found, MMU 204 determines that a page fault has occurred.

In the event of a page fault, MMU 204, in one embodiment, may be configured to raise a page fault exception by indicating the page fault in a page fault status register accessible to an entity that can service the page fault. In various embodiments, this entity may be a dedicated hardware unit (e.g., located within CPU 14 described above), software (e.g., an operating system), or a combination thereof. In some embodiments, MMU 204 may also store additional information in the page fault status registers to facilitate servicing the page fault. As discussed above, in various embodiments, MMU 204 is configured to service requests from pipeline stages 212 while the page fault is being serviced. In some embodiments, MMU 204 may be configured to service requests from all stages 212 except the stage 212 that generated the request producing the fault; in other embodiments, MMU 204 may also be configured to service requests from this stage 212 during this period as well.

As discussed above, in some embodiments, MMU 204 is further configured to send a response indicating that the data request caused a page fault to the pipeline stage 212 that generated the request. In various embodiments, this response is sent before the page fault has been serviced. As noted above, in some embodiments, this response has a similar format as a normal response, but does not include the requested data. In some embodiments, MMU 204 instead inserts the virtual address that caused the fault and any other information needed for memory interface unit 214 (or other circuitry in pipeline stage 212) to reproduce the request into the portion normally used to store the requested data. In some embodiments, MMU 204 may also set a flag in the response to indicate that the response is associated with a page fault and does not include the requested data (in some embodiments, MMU 204 may clear this flag in normal responses). In one embodiment, MMU 204 updates an entry in the translation cache to indicate the virtual address is associated with page fault. MMU 204 may subsequently access this entry to determine that subsequently received requests are also associated with the page fault (in some embodiments, MMU 204 can avoid performing another page table walk).

In various embodiments, MMU 204 is configured to send a response with the requested data once a page fault has been serviced. In some embodiments, MMU 204 may send this response in response to memory interface unit 214 retransmitting a request (in other embodiments, MMU 204 may automatically send this response without receiving a retransmitted request). For example, in one embodiment, if interface unit 214 replays a request, MMU 204 may send a response with the data to caches 220, where the data is loaded into a previously allocated cache line. Caches 220 may then forward the response to memory interface unit 214.

Memory management unit 204 is described in more detail next in conjunction with FIG. 3.

Figure 3:
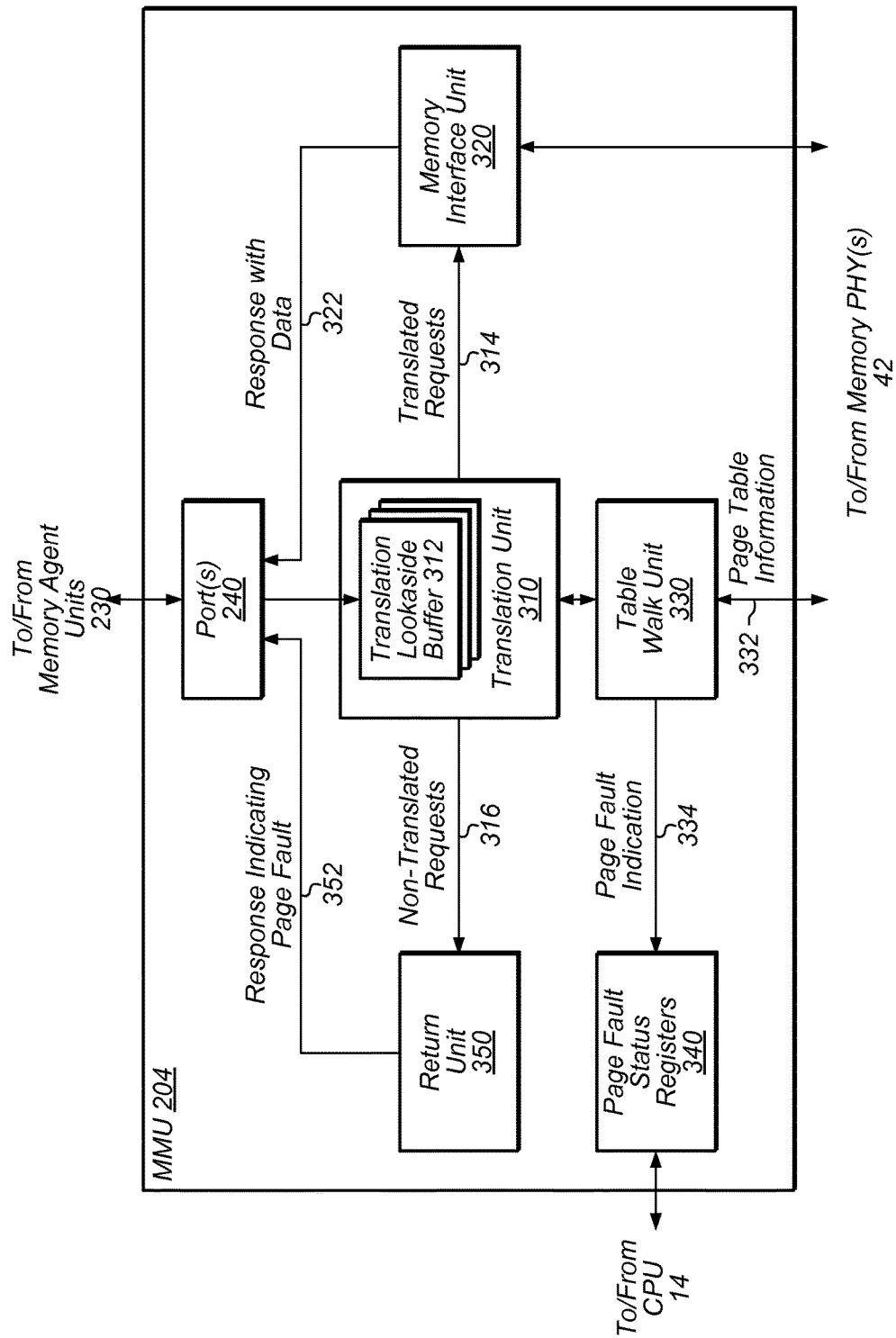
FIG. 3 is a block diagram illustrating one embodiment of the memory management unit.

Turning now to FIG. 3, one embodiment of memory management unit 204 is depicted. In the illustrated embodiment, MMU 204 includes translation unit 310, memory interface unit 320, table walk unit 330, page fault status registers 340, and return unit 350.

Translation unit 310, in one embodiment, is configured to translate virtual addresses of new requests 302 into physical addresses. In the illustrated embodiment, translation unit 310 includes a translation-lookaside buffer (TLB) 312 to facilitate translations. In some embodiments, TLB 312 includes one or more translation cache levels corresponding to each level of the page table used by table walk unit 330. For example, in one embodiment, TLB 312 may include three levels for pages, directories, and categories. In the illustrated embodiment, if a virtual address of a request 302 hits in TLB 312, translation unit 310 may provide the translated request 314 (i.e., the request with the virtual address replaced with the physical address) to memory interface unit 320. If the virtual address misses, translation unit 310, in one embodiment, requests a translation from table walk unit 330.

Memory interface unit 320, in one embodiment, is configured to transmit translated requests 314 to memory and receive corresponding responses 322 with data for serviced requests 314. In the illustrated embodiment, memory interface unit 320 communicates with memory 12 via physical memory interfaces 42.

Table walk unit 330, in one embodiment, is configured to perform a page table walk for information 332 stored in memory to find translations for virtual addresses that missed in TLB 312. If a translation is found for a given request 302, table walk unit 330, in one embodiment, provides the translation to translation unit 310, which, in turn, may translate the request 302 and update TLB 312. In one embodiment, if no translation is found, table walk unit 330 raises a page fault exception by storing a page fault indication 334 in page fault status registers 340. In some embodiments, this indication may include additional information that is accessible (e.g., by CPU 14) to aid in servicing the page fault. In one embodiment, page fault status registers 340 may be configured to store information for multiple page faults waiting to be serviced. In the illustrated embodiment, table walk unit 330 further indicates the page fault to translation unit 310, which, in turn, may update a corresponding entry in TLB 312 to indicate that the virtual address is associated with a pending page fault. Translation unit 310 may also provide an indication of the non-translated request 316 to return unit 350.

Return unit 350, in one embodiment, is configured to transmit a response 352 indicating that a request 302 caused a page fault. As discussed above, in some embodiments, this response may include the virtual address that cased the fault, a requestor ID (e.g., an identifier of the stage 212 that generated the request), a flag indicating that the response is associated with a pending page fault, etc. In various embodiments, memory interface unit 214 may use this response 352 to reproduce the original request 302 that created the page fault and retransmit that request 302.

Figure 4:
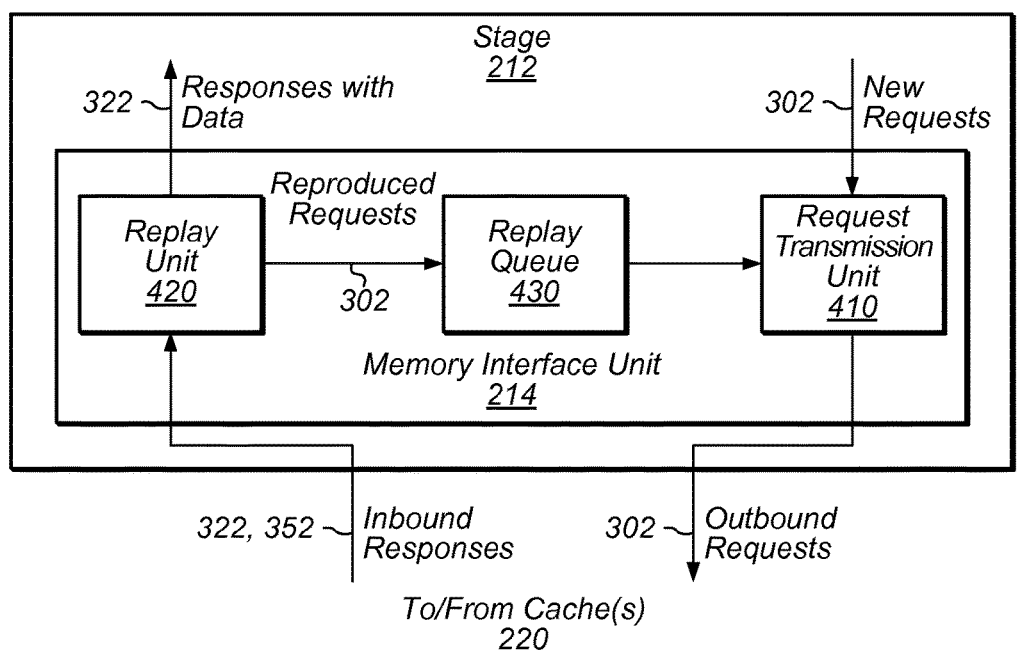
FIG. 4 is a block diagram illustrating one embodiment of a memory interface unit within a graphics pipeline stage.

Turning now to FIG. 4, one embodiment of memory interface unit 214 is depicted. In the illustrated embodiment, memory interface unit 214 includes a request transmission unit 410, replay unit 420, and replay queue 430.

Request transmission unit 410, in one embodiment, is configured to transmit outbound requests 302. Outbound requests may include new requests 302 from circuitry in a stage 212 or reproduced requests 302 from replay queue 430 (described below).

Replay unit 420, in one embodiment, is configured to examine inbound responses to determine whether they are responses with data 322 or responses indicating faults 352. If a response is determined to be a response 322, replay unit forwards the response to circuitry within state 212. If a response is determined to be a response 352, replay unit 420, in one embodiment, extracts information from the response 352 and uses the extracted information to reproduce the original request 302.

In the illustrated embodiment, replay unit 420 places reproduced requests 302 in replay queue 430 for retransmission by transmission unit 410. In some embodiments, transmission unit 410 may begin retransmitting requests 302 from queue 430 once it determines that queue 430 is full. For example, in one embodiment, replay queue 430 may indicate the number of stored requests 302 to transmission unit 410, and unit 410 may begin transmission once the number exceeds a particular threshold. In some embodiments, transmission unit 410 may also begin retransmitting a request 302 from queue 430 after particular amount of time has passed. In some embodiments, requests 302 from queue 430 may be given a higher priority over new requests 302; in other embodiments, reproduced requests 302 may be given the same or a lesser priority than new requests 302.

Figure 5:
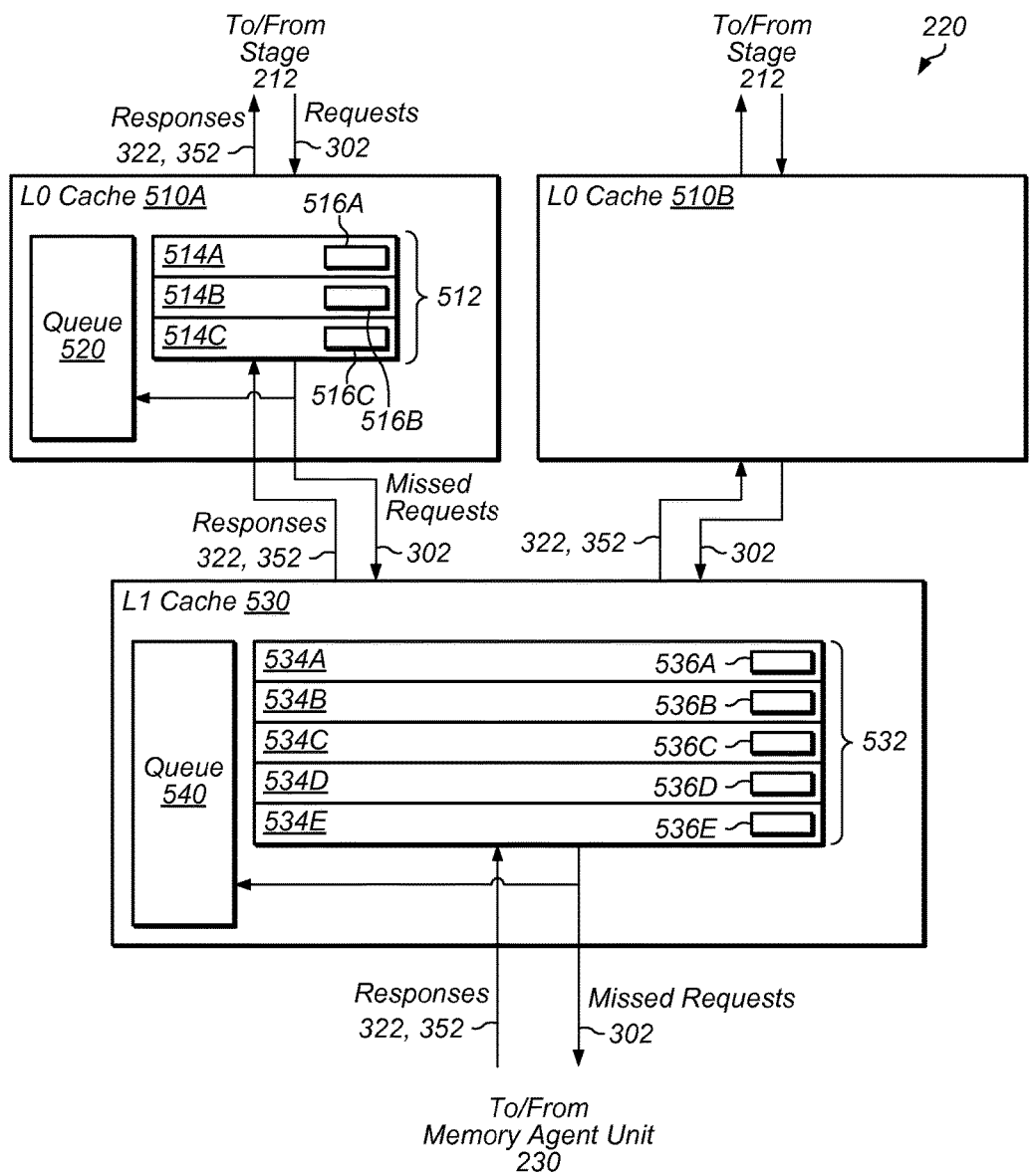
FIG. 5 is a block diagram illustrating one embodiment of one or more caches that may be included in the graphics controller.

Turning now to FIG. 5, one embodiment of caches 220 is depicted. In the illustrated embodiment, caches 220 include L0 caches 510A and 510B and L1 cache 530. L0 cache 510A, in turn, includes a cache bank 512 of caches lines 514 and a queue 520 (L0 cache 510B may configured in a similar manner). L1 cache 530 includes a cache bank 532 of cache lines 534 and a queue 540.

In various embodiments, caches 510 and 530 may allocate caches lines 514 A-C and 534 A-E, respectively, for requests 302 that result in misses. In the illustrated embodiment, caches 510 and 530 may store information about the allocations in queues 530 and 540, respectively. Caches 510 and 530 may also use queues 520 and 540 to store information for related missing requests (i.e., those that request data from the same cache lines).

In various embodiments, caches 510 and 530 may fill the allocated cache lines 514 and 534 when responses 322 and 352 are subsequently received. In the illustrated embodiments, caches 510 and 530 set flags 516A-C and 536A-E to indicate that their respective cache lines 514 and 534 includes information collected from responses 352, and thus do not include the requested data. Caches 510 and 530 may clear flags 514 and 534 when the actual data comes back from MMU 204 and is inserted into the cache lines 514 and 534.

Figure 6:
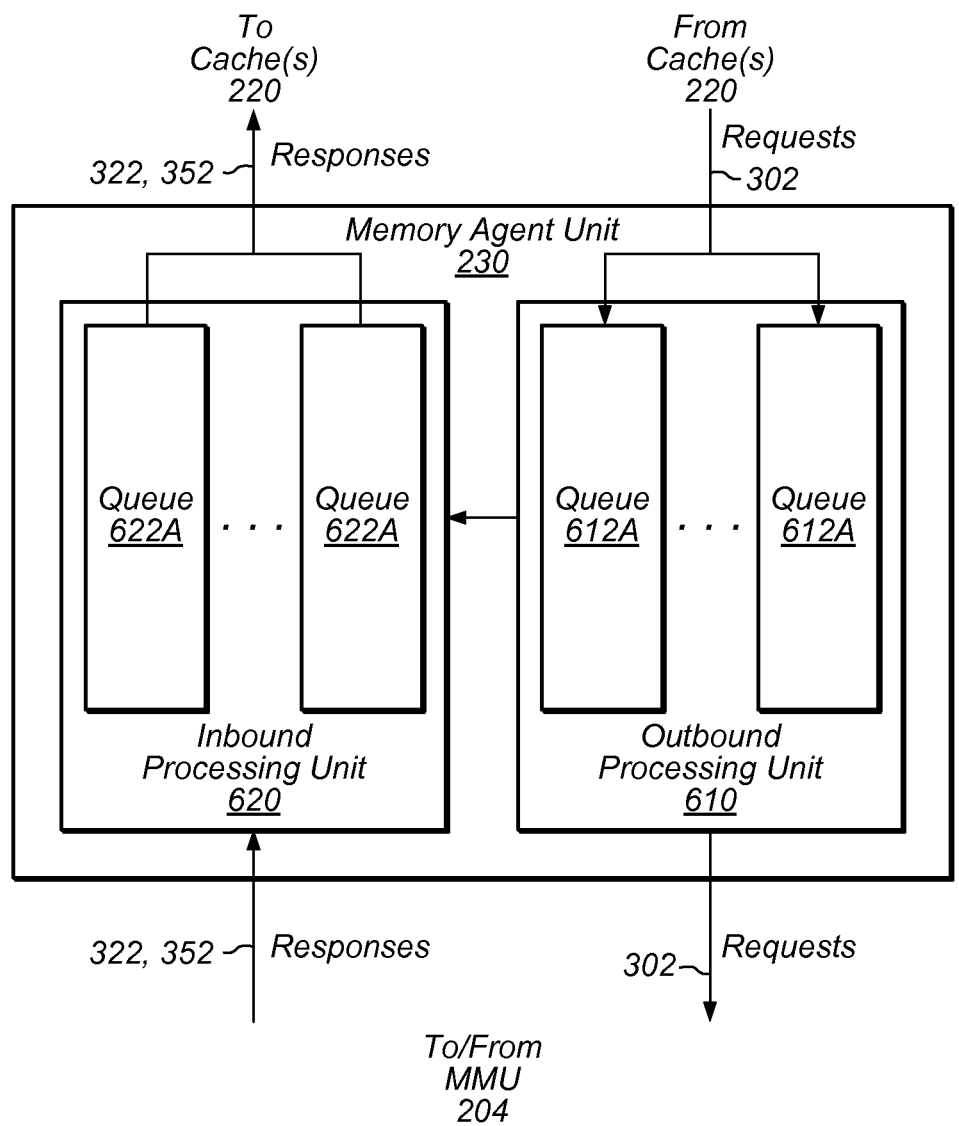
FIG. 6 is a block diagram illustrating one embodiment of a memory agent unit that may be included in the graphics controller.

Turning now to FIG. 6, one embodiment of a memory agent unit 230 is depicted. In the illustrated embodiment, memory agent unit 230 includes an outbound processing unit 610 and inbound processing unit 620. In one embodiment, outbound processing unit 610 is configured to select requests 302 from queues 612A-B and send the requests 302 to MMU 204 (outbound processing unit 610 may use any suitable arbitration scheme for selecting requests 302). In one embodiment, inbound processing unit 620 is configured to process responses 322 and 352 received from MMU 204. In some embodiments, inbound processing unit 620 uses queues 622A-B to reorder responses 322 and 352 so that they are provided to their respective stages 212 in the order in which their corresponding requests 302 were received. In one embodiment, outbound processing unit 610 may track the ordering of received requests 302 and provide the ordering to inbound processing unit 620 to facilitate the reordering.

Figure 7:
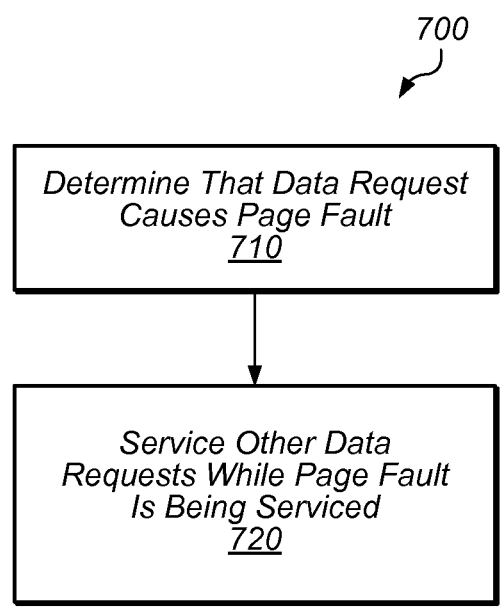
FIG. 7 is a flow diagram illustrating one embodiment of a method for handing a page fault.

Turning now to FIG. 7, a flow diagram of a method 700 for handing a page fault is depicted. Method 700 is one embodiment of a method that may be performed by an integrated circuit that includes a pipeline (e.g., graphics pipeline 210) and a memory management unit such IC 10.

Method 700 begins with step 710 in which a memory management unit determines that a first data request from a first graphics pipeline stage causes a page fault. In step 720, the memory management unit services requests from one or more other pipeline stages while the page fault is being serviced. Step 720 may include performing any of the operations described above to service other requests while the page fault is pending. In many instances, performance of method 700 can reduce the chances that a page fault will result in a pipeline stall.

Figure 8:
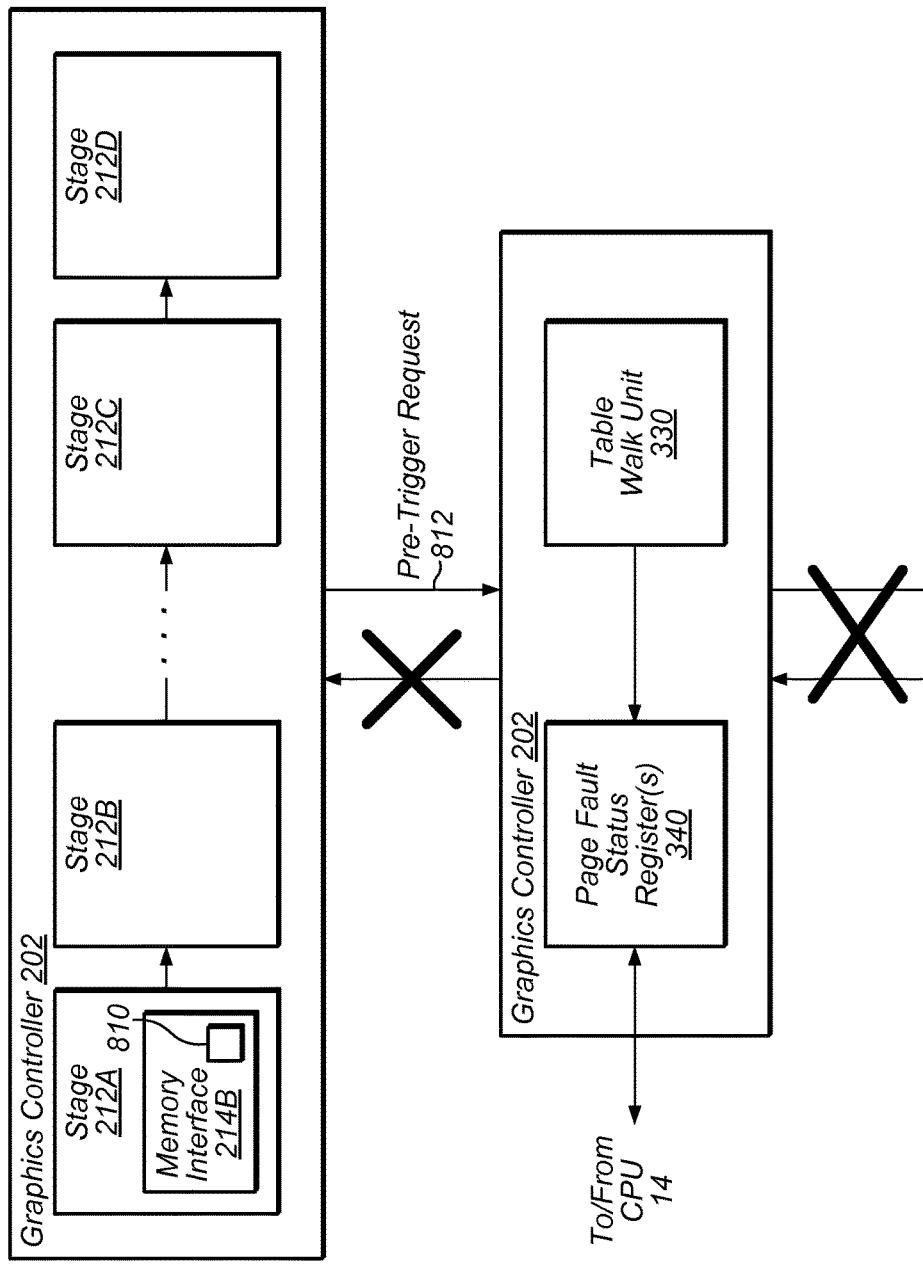
FIG. 8 is a block diagram illustrating one embodiment of a graphics controller and a memory management unit configured to preempt page faults.

Turning now to FIG. 8, one embodiment in which graphics controller 202 and memory management unit 204 are configured to preempt page faults is depicted. In the illustrated embodiment, graphics controller 202 includes a generation unit 810 configured to generate a pre-trigger request 812 to cause memory management unit 204 to raise a page fault exception in status registers 340. Generation unit 810 may be located in any suitable location within controller 202. In some embodiments, generation unit 810 may be external to controller 202. In some embodiments, controller 202 may include multiple instances of generation unit 810 (e.g., associated with different respective pipeline stages 212). In one embodiment, data requests 812 are write requests that include an indication that causes MMU 204 to not write their contents to memory. In another embodiment, data requests 812 are read requests that include an indication that causes MMU 204 to not provide a response with requested data. In various embodiments, a request 812 leaves no record as it passes through caches 220 and may be terminated if it hits in one of cache 220.

In some embodiments, generation unit 810 is configured to identify potential pages needed to render a set of frames (e.g., based on information collected during rendering), and to generate requests 812 for those identified pages (e.g., for each of the textures encountered within each tile rendered). For example, in some embodiments, generation unit 810 may predict texture addresses of future tiles and issue requests 812 based on texture size, coordinates, gradients, tile positions, the frame sizes, etc. (In some embodiments, generation unit 810 is configured to generate a data request 812 in response to receiving an instruction from software— e.g., an application or driver.)

In various embodiments, MMU 204 is configured to raise a page fault exception in response a request 812 without performing a corresponding write operation or a corresponding read operation. In some embodiments, MMU 204 may be configured to disregard a request 812 based on one or more criteria (e.g., if MMU 204 already has a translation for the virtual address specified by the request 812). In one embodiment, MMU 204 may alternatively let software decide to ignore the request 812 by indicating in status registers 340 that servicing the page fault is optional (i.e., it is not necessary to service the page fault at the present time).

Figure 9:
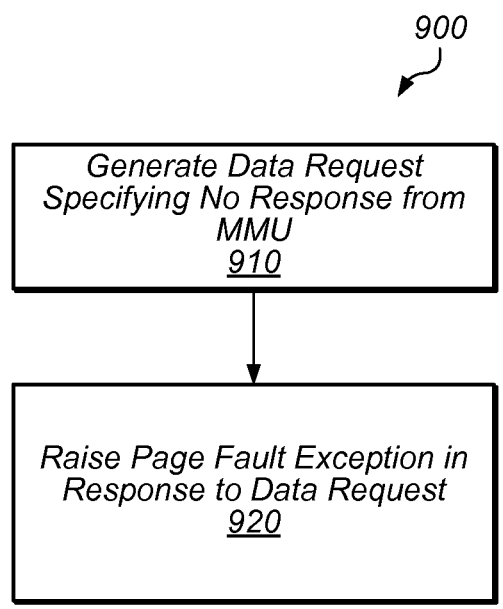
FIG. 9 is a flow diagram illustrating one embodiment of a method for preempting page faults.

Turning now to FIG. 9, a flow diagram of a method 900 for preempting page faults is depicted. Method 900 is one embodiment of a method that may be performed by an integrated circuit that includes a graphics controller such IC 10. Method 900 begins with step 910 in which a graphics controller generates a data request to cause the memory management unit to raise a page fault exception. As discussed above, in some embodiments, the data request may be a write request; in other embodiments, the data request may be a read request. In step 920, the memory management unit raises a page fault exception in response to the request. In some embodiments, the memory management unit may alternatively decide to ignore the request. In many instances, performance of method 900 can reduce the chances that a page fault will result in a graphics pipeline stall.

Exemplary Computer System

Figure 10:
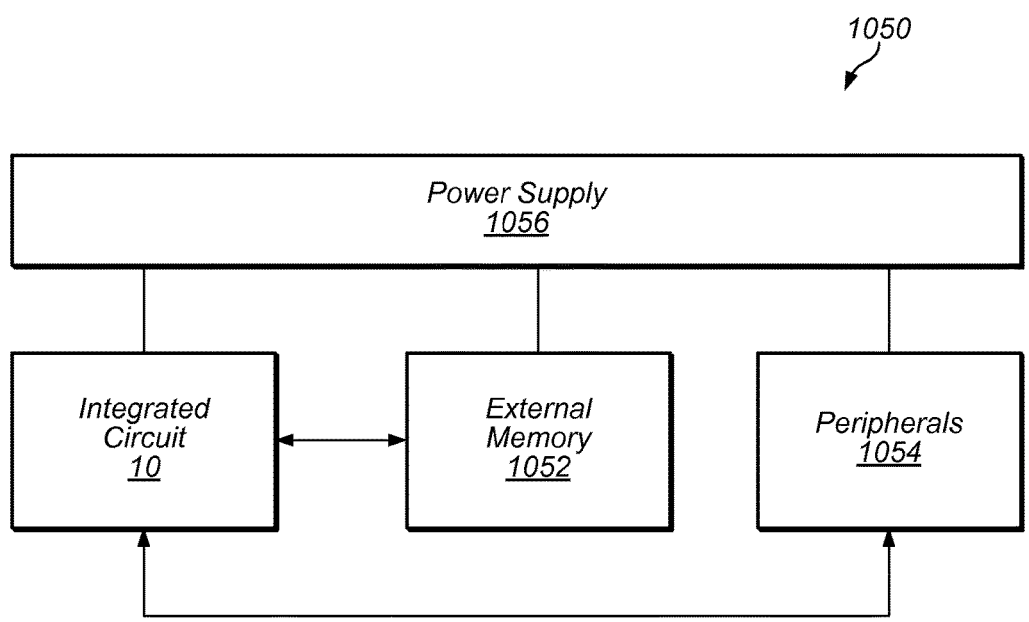
FIG. 10 is a block diagram illustrating one embodiment of an exemplary computer system.

Turning next to FIG. 10 a block diagram of one embodiment of a system 1050 is shown. In the illustrated embodiment, the system 1050 includes at least one instance of an integrated circuit 10 coupled to an external memory 1052. The external memory 1052 may form the main memory subsystem discussed above with regard to FIG. 1 (e.g. the external memory 1052 may include the memory 12A-12B). The integrated circuit 10 is coupled to one or more peripherals 1054 and the external memory 1052. A power supply 1056 is also provided which supplies the supply voltages to the integrated circuit 1058 as well as one or more supply voltages to the memory 1052 and/or the peripherals 1054. In some embodiments, more than one instance of the integrated circuit 10 may be included (and more than one external memory 1052 may be included as well).

The memory 1052 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit 10 in a chip-on-chip configuration, a package-on-package configuration, or a multi-chip module configuration.

The peripherals 1054 may include any desired circuitry, depending on the type of system 1050. For example, in one embodiment, the system 1050 may be a mobile device (e.g. personal digital assistant (PDA), smart phone, etc.) and the peripherals 1054 may include devices for various types of wireless communication, such as wifi, Bluetooth, cellular, global positioning system, etc. The peripherals 1054 may also include additional storage, including RAM storage, solid state storage, or disk storage. The peripherals 1054 may include user interface devices such as a display screen, including touch display screens or multitouch display screens, keyboard or other input devices, microphones, speakers, etc. In other embodiments, the system 1050 may be any type of computing system (e.g. desktop personal computer, laptop, workstation, net top etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a graphics pipeline including a plurality of pipeline stages;
   a memory management unit configured to:
      receive a first data request from a first of the plurality of pipeline stages, wherein the first data request includes a virtual address;
      determine that the first data request causes a page fault;
      service requests from one or more others of the plurality of pipeline stages while the page fault is being serviced; and
      send, to the first pipeline stage, a first response indicating that a page fault for the first data request occurred, wherein sending the first response includes sending the virtual address in the first response, and wherein the virtual address is to be included in a retransmission of the first data request by the first pipeline stage.

2. The apparatus of claim 1, wherein the first pipeline stage is configured to retransmit the first data request in response to receiving the first response and determining that one or more criteria have been satisfied.

3. The apparatus of claim 1, further comprising:
   a memory agent unit coupled between the graphics pipeline and the memory management unit, wherein the memory agent unit is configured to:
      store an ordering in which a set of data requests including the first data request are provided to the memory management unit from the first pipeline stage; and
      use the stored ordering to reorder a set of corresponding responses including the first response during transmission from the memory management unit to the first pipeline stage.

4. The apparatus of claim 1, further comprising:
   a cache coupled between the graphics pipeline and the memory management unit, wherein the cache is configured to:
      allocate a cache line in response to receiving the first data request;
      store a portion of the first response in the allocated cache line in response receiving the first response from the memory management unit; and
      replace the stored portion with requested data after the page fault has been serviced.

5. An integrated circuit, comprising:
   a memory management unit, wherein the memory management unit is configured to:
      service data requests received from a plurality of pipeline stages;
      determine that a first data request received from a first of the plurality of pipeline stages causes a page fault, wherein the first data request includes a virtual address; and
      in response to determining that the first data request causes the page fault, cause the first pipeline stage to retransmit the first data request after the page fault has been serviced, wherein the memory management unit is configured to cause the first pipeline stage to retransmit the first data request by sending a response to the first pipeline stage, wherein sending the response includes sending, in the response, an indication of the page fault and the virtual address of the first data request.

6. The integrated circuit of claim 5, wherein the memory management unit is configured to continue servicing data requests from ones of the plurality of pipeline stages while the page fault is being serviced.

7. The integrated circuit of claim 5, wherein the first data request is a read request, and wherein the memory management unit is configured to:
   send a respective response for each received read request, wherein each respective response includes a first portion for storing requested data of the read request and a second portion for indicating whether the read request caused a page fault; and
   provide the indication of the page fault to the first pipeline stage by inserting the indication into the second portion of the response for the first data request.

8. The integrated circuit of claim 7, wherein the memory management unit is configured to insert the virtual address of the first data request in the first portion of the response for the first data request, and wherein the first pipeline stage is configured to extract the virtual address to retransmit the first data request.

9. An integrated circuit, comprising:
   a graphics pipeline, wherein the pipeline includes a plurality of pipeline stages including a first pipeline stage, wherein the first pipeline stage is configured to:
      send a first data request to a memory management unit, wherein the first data request includes a virtual address;
      receive, from the memory management unit, a response indicating that the first data request caused a page fault, wherein receiving the response includes receiving the virtual address in the response; and
      retransmit the first data request to the memory management unit in response to receiving the response, wherein the retransmitted first data request includes the virtual address.

10. The integrated circuit of claim 9, further comprising: the memory management unit, wherein the memory management unit is configured to:
   transmit the response before the page fault has been serviced; and
   transmit data for the first data request to the first pipeline stage after the page fault has been serviced.

11. The integrated circuit of claim 9, wherein the response includes a dedicated portion for indicating whether the response is associated with a request that caused a page fault; and wherein the first pipeline stage is configured to retransmit the first data request in response to examining the dedicated portion.

12. The integrated circuit of claim 9, wherein the first pipeline stage is configured to:
   determine whether a number of received indications specifying data requests that caused pages faults exceeds a particular threshold; and
   begin retransmitting the first data request in response to determining that the number exceeds the threshold.

13. A method, comprising:
   a first pipeline stage of a graphics pipeline sending a first data request to a memory management unit, wherein the first data request includes a virtual address and causes the memory management unit to raise a page fault exception indicating that a page fault has occurred;
   the memory management unit servicing requests from other pipeline stages of the graphics pipeline while the page fault is being serviced; and
   the memory management unit causing the first pipeline stage to retransmit the first data request by transmitting a response for the first data request to the first pipeline stage, wherein transmitting the response includes transmitting the virtual address in the response, wherein the virtual address is to be included in the first data request upon retransmission.

14. The method of claim 13, wherein the response does not include data requested by the first data request, and wherein the virtual address is included a location of the response reserved for the data.

15. The method of claim 13, wherein the memory management unit transmits the response before the page fault has been serviced.

16. The method of claim 13, further comprising:
   the memory management unit servicing the first data request after the page fault has been serviced, wherein the servicing includes sending data requested by the first data request to a cache; and
   the first pipeline stage receiving the requested data from the cache in response to retransmitting the first data request.

17. The method of claim 13, further comprising:
   the memory management unit allocating an entry for a virtual address included by the first data request in a translation cache, wherein the entry includes that the virtual address is associated with a page fault that has not been serviced yet.

* * * * *